United States Patent
Dersjö et al.

(10) Patent No.: US 8,467,943 B2
(45) Date of Patent: Jun. 18, 2013

(54) METHOD FOR CONTROLLING A WORK MACHINE DURING OPERATION IN A REPEATED WORK CYCLE

(75) Inventors: Jan Dersjö, Torshälla (SE); Björn Brattberg, Torshälla (SE)

(73) Assignee: Volvo Construction Equipment AB, Eskilstuna (SE)

( * ) Notice: Subject to any disclaimer, the term of this patent is extended or adjusted under 35 U.S.C. 154(b) by 568 days.

(21) Appl. No.: 12/597,524

(22) PCT Filed: May 10, 2007

(86) PCT No.: PCT/SE2007/000456
§ 371 (c)(1),
(2), (4) Date: Oct. 26, 2009

(87) PCT Pub. No.: WO2008/140360
PCT Pub. Date: Nov. 20, 2008

(65) Prior Publication Data
US 2010/0131122 A1 May 27, 2010

(51) Int. Cl.
*B60W 30/18* (2006.01)
(52) U.S. Cl.
USPC ............... 701/50; 701/56; 701/65; 701/468
(58) Field of Classification Search
None
See application file for complete search history.

(56) References Cited

U.S. PATENT DOCUMENTS

| | | | |
|---|---|---|---|
| 5,065,326 A | 11/1991 | Sahm | |
| 5,510,982 A | 4/1996 | Ohnishi et al. | |
| 5,682,312 A | 10/1997 | Rocke | |
| 5,832,400 A | 11/1998 | Takahashi et al. | |
| 5,899,950 A | 5/1999 | Milender et al. | |
| 5,944,764 A * | 8/1999 | Henderson et al. | 701/50 |
| 6,076,030 A * | 6/2000 | Rowe | 701/50 |
| 6,223,110 B1 | 4/2001 | Rowe et al. | |
| 6,292,736 B1 | 9/2001 | Aruga et al. | |
| 7,747,369 B2 * | 6/2010 | Koehrsen et al. | 701/50 |
| 2002/0143454 A1 | 10/2002 | Bates et al. | |
| 2006/0047377 A1 * | 3/2006 | Ferguson et al. | 701/2 |

FOREIGN PATENT DOCUMENTS

| | | |
|---|---|---|
| DE | 4130265 A1 | 3/1993 |
| EP | 0645559 A1 | 3/1995 |
| WO | 9859119 A1 | 12/1998 |
| WO | 2005028926 A1 | 3/2005 |
| WO | WO2005/028926 A1 * | 3/2005 |

OTHER PUBLICATIONS

International Search Report for corresponding International Application PCT/SE2007/000456, Feb. 6, 2008.
International Preliminary Report on Patentability for corresponding International Application PCT/SE2007/000456, Jul. 2, 2009.
European Search Report (Nov. 21, 2012) for corresponding European App. EP07748120.

\* cited by examiner

*Primary Examiner* — Michael J. Zanelli
(74) *Attorney, Agent, or Firm* — WRB-IP LLP (57) ABSTRACT

A method is provided for controlling a work machine during operation in a repeated work cycle including the steps of establishing a control strategy on the basis of at least one condition that varies in the course of the work cycle, and controlling at least one device in a work machine power transmission system in response to the established control strategy.

33 Claims, 9 Drawing Sheets

METHOD FOR CONTROLLING A WORK MACHINE DURING OPERATION IN A REPEATED WORK CYCLE

BACKGROUND AND SUMMARY

The present invention relates to a method for controlling a work machine during operation in a repeated work cycle.

The term "work machine" comprises different types of material handling vehicles like construction machines, such as a wheel loader and a dump truck (such as an articulated hauler). A work machine is provided with a bucket, container or other type of work implement for carrying/transporting a load. Further terms frequently used for work machines are "earth-moving machinery" and "off-road work machines".

In connection with transportation of heavy loads, e.g. in contracting work, work machines are frequently used. A work machine may be operated with large and heavy loads in areas where there are no roads, for example for transports in connection with road or tunnel building, sand pits, mines and similar environments.

The term work cycle comprises a route of the work machine (ie the work cycle travel path) and/or a movement of the work implement (lifting/lowering operation). During the performance of the work cycle, the work machine often encounters different gradients of the ground (uphill and downhill), and turns (cornering).

According to a first work cycle example, a wheel loader typically drives into a heap of material, lifts the bucket, reverses out of the heap, turns and is forwarded towards a dump truck where it unloads the material onto the container of the dump truck. After unloading, the wheel loader returns to the starting position.

According to a second work cycle example, a dump truck is loaded at a first position, driven along a varied route, unloaded at a second position and driven back along the varied route. Normally, an excavator or wheel loader loads the container of the dump truck at the first position.

WO 2005/028926 discloses a method for automatically selecting a specific gear mode from a plurality of gear modes on the basis of the type of work cycle that the vehicle currently performs. The vehicle gear box is controlled in response to the selected gear mode. The type of work cycle is determined by detecting a total distance the vehicle is driven in an individual sequence with one of a forward gear position and a reverse gear position.

It is desirable to reduce fuel consumption and/or increase productivity, ie transporting as much material in as short time as possible in a cost-efficient way. Further, the transportation should preferably be performed with due regard to environmental factors.

According to an aspect of the present invention, a method is provided for controlling a work machine during operation in a repeated work cycle comprising the step of controlling the work machine in response to a predetermined control strategy that is based on at least one condition that varies in the course of the work cycle.

The condition which varies may regard for example a work machine behaviour, a work cycle travel path direction and/or a work implement operation. More specifically, the condition variation may comprise a predicted and/or experienced sequence of events that takes place during performance of the work cycle and which is relevant for the control of the work machine. Each such event represents an important change in a work machine operational parameter, and each event is preferably associated to a position along the work cycle travel path.

According to a preferred embodiment, the method comprises the step of establishing the control strategy on the basis of said at least one condition that varies in the course of the work cycle. Thus, the control strategy (or control model) is built up on the basis of the condition variation. The condition variation is associated to a variation in the work machine operational characteristics. In other words, the sequence of events is built up in response to the predicted and/or experienced driving pattern along the work cycle route.

According to a further development of the last mentioned embodiment, the control strategy is based on a condition that varies between end positions of the work cycle. A first of said end positions preferably comprises a loading position and a second of said end positions preferably comprises an unloading position for the work machine.

According to a further preferred embodiment, the method comprises the step of detecting at least one operational parameter during operation of a work machine in the work cycle in question, and establishing at least part of the control strategy on the basis of a magnitude of the detected operational parameter. Preferably, the method comprises the step of repeatedly detecting said at least one operational parameter. Further, a plurality of operational parameters are preferably detected, such as an operational parameter indicative of the work machine weight, an operational parameter indicative of an end position of the work cycle, an operational parameter indicative of a rolling resistance, an operational parameter indicative of a resistance to ground inclination, an operational-parameter indicative of the speed of the work machine and a change of direction of the work cycle travel path. Said at least one operational parameter is preferably substantially continuously repeatedly detected.

Thus, an event may be established on the basis of the detected operational parameter in a previously performed work cycle and used for controlling a work machine by means of the control strategy in a later performed work cycle. More particularly, an individual work machine may be adapted to learn from past experiences.

According to a further preferred embodiment, the method comprises the step of predicting at least part of the condition variation on the basis of pre-available information of the work cycle in question. Such information may be formed by geographical maps of the area covering the work cycle travel path, knowledge of the specific work cycle travel path (comprising turns and slopes), the material to be transported, ground conditions, weather conditions etc. For example, a satellite based system (such as the GPS) may be used for establishing the work cycle travel path.

According to a further preferred embodiment, the control strategy is established on the basis of both detected operational parameters while performing the work cycle and available information of the work cycle in question.

Thus, the work cycle route may be indicated in a topographical map, wherein turns and slopes are defined.

The control strategy is based on such a topographical map and it may be modified based on detected operational conditions such as rolling resistance etc.

Further, the condition variation, such as the work machine behaviour, may differ when the work cycle is performed depending on for example the type, size, condition and weight of the work machine. More specifically, the weight differs substantially in a loaded condition and an unloaded condition. For example, an articulated hauler may have a weight in the order of 15-30 metric tons and may be loaded with a payload in the order of 20-35 tons. Further, different models of a work machine may react differently when the work cycle is performed. Further, different individuals in a fleet may be of different age and have different operation history with a resulting wear in response thereto etc.

Such variations may be taken into account when establishing the control strategy for an individual work machine.

According to a further preferred embodiment, the control strategy comprises a plurality of control steps, wherein each step is established on the basis of the condition variation. Preferably, the work cycle travel path comprises a plurality of positions, wherein each position is established on the basis of the condition variation.

Each control step indicates that the work machine should be effected for an optimum control. Such a control step may be indicated by the position of a change in altitude, or a change in direction, of the work cycle travel path. Further, such a control step may be indicated by the position of a change of the ground conditions (with regard to rolling resistance and/or grip, ie hard versus slippery surface). Further, such a control step may be effected by a total weight of the work machine (comprising any transported material).

According to a preferred embodiment, the method comprises the step of controlling at least one device in a work machine power transmission system in response to the established control strategy during operation of the work machine in the work cycle. Especially, the control strategy comprises work machine powertrain operating information and the method comprising the step of controlling a powertrain component. The term "powertrain" comprises the system for moving the work machine from (and including) a power source (such as a diesel engine) to the ground engaging members (such as wheels).

According to a further preferred embodiment, the control strategy comprises information regarding gear selection and the method comprising the step of controlling a transmission. Preferably, the control strategy comprises information regarding selection of a gear mode from a plurality of gear modes and the method comprising the step of controlling a transmission.

Thus, for a work machine with an automatic gearbox a so-called gear mode or gear function is automatically selected in response to the established control strategy. The gear modes may differ in that changing to a higher gear, changing up, is carried out at different minimum engine speeds, for changing between corresponding gears, and changing to a lower gear is carried out at different minimum vehicle speeds. By automatically controlling the gearbox in response to the established sequence of control events, fuel efficiency can be improved. Further, wear on the transmission can be reduced.

According to a further preferred embodiment, the control strategy comprises information regarding a differential gear operation and the method comprising the step of controlling the differential gear. An articulated hauler comprises a longitudinal and/or transverse differential gear with an associated differential gear lock mechanism. Such differential gear lock mechanisms are used to increase the off road driveability, but they are often engaged also when they are not needed. By automatically controlling the activation of the differential gear lock mechanisms in response to the established sequence of control events, fuel efficiency can be improved and less wear on the components can be achieved, leading to a longer life.

Other advantageous embodiments of the invention and its associated advantages are apparent from the following description.

BRIEF DESCRIPTION OF THE DRAWINGS

The invention will be explained below, with reference to the embodiments shown on the appended drawings, wherein FIG. 1 schematically shows a wheel loader in a side view, FIG. 2 schematically shows a first exemplary embodiment of a powertrain, a hydraulic system and a control system of the wheel loader in FIG. 1.

DETAILED DESCRIPTION

Figure 1:
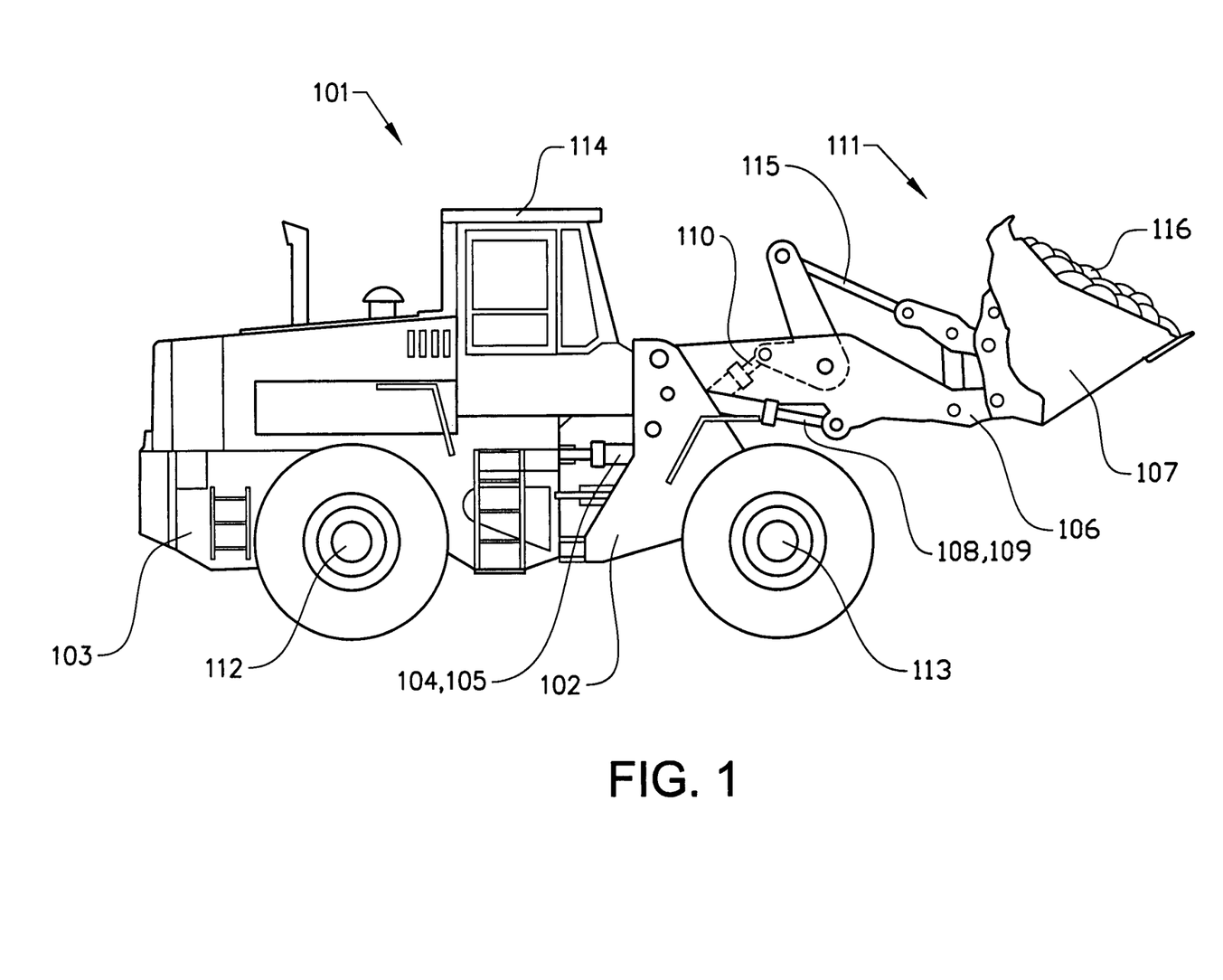

FIG. 1 shows a frame-steered work machine constituting a wheel loader 101. The body of the wheel loader 101 comprises a front body section 102 and a rear body section 103, which sections each has a pair of half shafts 112,113. The rear body section 103 comprises a cab 114. The body sections 102,103 are connected to each other in such a way that they can pivot in relation to each other around a vertical axis by means of two first actuators in the form of hydraulic cylinders 104,105 arranged between the two sections. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
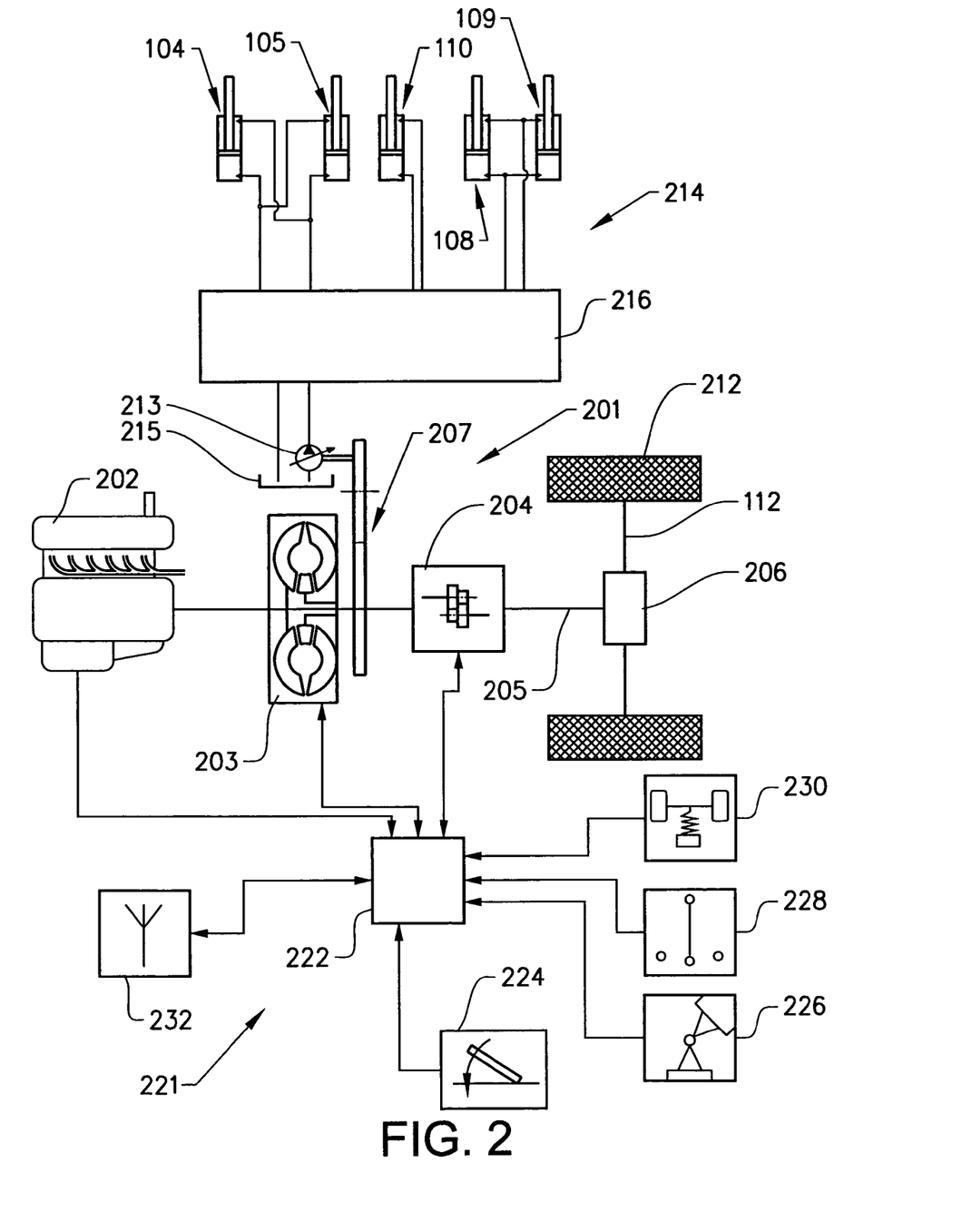

FIG. 2 schematically shows a first embodiment of a powertrain 201 and a hydraulic system 214. The powertrain 201 comprises a power source 202 (prime mover) in the form of an internal combustion engine and a transmission for transmitting power from the engine 202 to the wheels 212 for propelling the wheel loader. The engine 202 is preferably a diesel engine. The powertrain 201 is of a mechanical type and comprises from the engine 202 to the wheels 212 the following: a transmission unit 203, in the form of a torque converter, a gearbox 204, a cardan shaft 205, a differential gear 206 and transverse half shafts 112. The gearbox is adapted for varying the speed of the vehicle, and for changing between forward and backward driving direction of the wheel loader 101.

The torque converter 203 is able to increase the torque, which means that the output torque of the torque converter can be for example in the interval 1-3 times the torque of the internal combustion engine 202. Furthermore, the torque converter has preferably a free wheel function and a lock-up function for direct operation without any increased torque. Thus, the transmission ratio of the torque converter in the lockup state is fixed, and preferably substantially 1:1. However, in an alternative embodiment the transmission unit 203 could be an ordinary clutch for disengagement or direct operation without any increased torque. Such a clutch could be a hydraulic clutch as well as a mechanical clutch, such as a variably controlled friction slip clutch.

The engine 202 is adapted to provide a motive power for propelling the vehicle and to operatively drive at least one variable displacement pump 213 in the hydraulic system 214 for lifting operations and steering the wheel loader 101. The hydraulic pump 213 is driven by the internal combustion engine 202, preferably via gear wheels 207 arranged between the torque converter 203 and the gearbox 204.

The pump 213 is configured for delivering pressurized hydraulic fluid from a tank 215 to the cylinders 104,105,108, 109,110. A number of electronically controlled valve units are hydraulically connected between the pump 213 and the cylinders 104,105,108, 109,110 for regulating the reciprocating work of the cylinders. The system of hydraulic valve units is, for ease of presentation, represented by a single box 216.

FIG. 2 further shows a first exemplary embodiment of a control system 221 for controlling the engine 202 and the gearbox 204 of the wheel loader 101. The control system 221 comprises a control unit 222 with software for controlling the wheel loader 101. The control unit 222 is connected to the gearbox 204 for controlling the gear box according to an established control strategy, see further below.

The control unit 222 is commonly known as a central processing unit (CPU) or an electronic control module (ECM) for an electronic control of the vehicle operation. In a preferred embodiment, the control unit comprises a microprocessor. The control unit 222 comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

The control system 221 comprises a sensor (not shown) for detection of a speed of the vehicle. The sensor can consist of or comprise a magnetic pick-up device that detects the movement of a gear tooth in the gearbox, as the speed of rotation of the gear tooth corresponds to the speed of the engine. The sensor is arranged to generate a signal with this information to the control unit 222. The control unit 222 receives signals from said sensor.

The control unit 222 is further adapted for controlling the speed of the engine 202 via known control means, such as via a fuel pump. The control unit 222 receives information concerning the required speed of the engine from a sensor 224, which detects the position of a throttle pedal and generates a signal with information about the position of the throttle pedal to the control unit 222. The engine speed is thus increased with increased depression of the throttle pedal.

A steering angle sensor 226 is adapted to detect the steering angle of the vehicle, ie the inclination between the two vehicle parts 102,103 with regard to a vertical axis and generates a corresponding signal for input to the controller 222. Such a sensor may be constituted by a linear sensor arranged for detecting an extension of one of said steering cylinders 104, 105, or a rotary sensor, positioned at the steering joint. Thus, the sensor 226 is adapted to detect a change of direction of the travel path in a horizontal plane. Alternatively, the steering angle sensor may be adapted for detecting a turning amount of a steering wheel or deflection of a steering lever.

An inclination sensor 228 determines the inclination of the horizontal longitudinal axis of the work machine and generates a corresponding signal for input to the controller 222. Thus, the inclination sensor 228 is adapted to detect a ground inclination of the travel path.

An axle load sensor 230 is adapted to detect a loading condition of the work machine and generates a corresponding signal for input to the controller 222. It is possible to replace the axle load sensor with wheel load sensors associated with the individual wheels. That has the advantage of permitting a comparison to be made between the wheel loads on the left side of the vehicle and the right side of the vehicle to find out if there is a risk for the work machine turning over for instance in a curve.

All the sensors mentioned above are known per se to a man skilled in the art of work machine powertrains so their structure need not be explained here.

The control system 221 further comprises a means 232 for establishing a position of the working machine 101. The positioning means 232 is constituted by an antenna and is adapted to communicate with external means, such as satellites for establishing the work machine position. The control system 221 may use the Global Positioning System (GPS). This is further described below with reference to FIG. 8.

A rolling resistance of the work machine is determined. The rolling resistance is dependent on a ground condition. More particularly, rolling resistance is a measure on a powertrain load for moving the work machine with a certain speed. The rolling resistance is higher with looser ground, such as mud or snow. Likewise, resistance due to ground inclination is a measure on a powertrain load for moving the work machine with a certain speed upwards. A measure of the powertrain load may be established based on a torque transmitted by means of the torque converter 203.

Although not illustrated in FIG. 2, the powertrain 201 includes sensors at various strategic positions for measuring the torque, or measuring parameter signals allowing the subsequent calculation or estimation of the torque; the sensors are beneficially implemented as rotation rate sensors, for example tachometers implemented as optical or inductive encoders, operable to generate signals; from the signals, a measure of the torque can be computed from angular acceleration dω/dt using Equation 1 (Eq. 1)

$$T = I \frac{dw}{dt} \qquad \text{Eq. 1}$$

wherein
T=torque; and
I=moment of inertia.

Since rolling resistance and resistance, due to ground inclination are affected by vehicle total weight the vehicle weight is detected during driving. This could be done either by a load weighing system, see above, or by acceleration calculations. The weight of the load is preferably set to zero whenever the bucket is lifted from the frame (it is assumed that the complete load is then released/emptied). The weight is preferably only calculated when the ground inclination is near zero.

The control unit 222 is adapted to control the gear modes of the gearbox 204 and more specifically by automatic changing between different gears.

Figure 3:
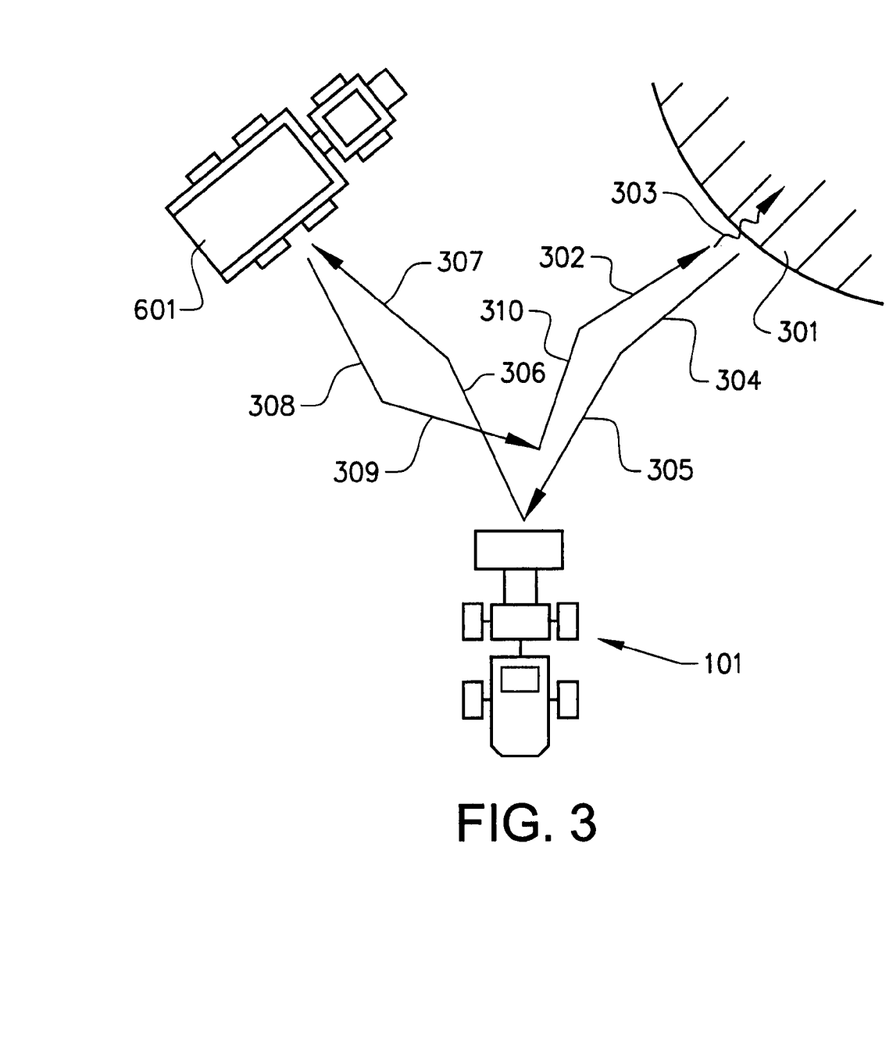
FIG. 3 illustrates a short cycle loading with the wheel loader.

With reference to FIG. 3, a work cycle in the form of so-called short-cycle loading for the wheel loader 101 is shown. The short-cycle loading is characterized in that the longest distance that the vehicle travels between a loading and an unloading position does not exceed a certain number of meters, in this case of the order of 15 meters. More specifically, the wheel loader 101 is used to scoop up material from the loading position (excavating a natural ground 301) with the bucket 107 and unload it in the unloading position (onto a container of a dump truck 601 in the form of an articulated hauler).

FIG. 3 shows a driving pattern comprising a series of steps from excavation to loading onto the dump truck 601. Specifically, the wheel loader 101 travels forward, see arrow 302, to the natural ground 301 in for example a forward second speed gear. The wheel loader is in a straight position, wherein the front and rear vehicle parts are in line. When it approaches the natural ground 301, it thrusts into the natural ground in for example a forward first speed gear in order to increase tractive force, see arrow 303. The lifting arm unit is raised, wherein the bucket 107 is filled with material from the natural ground.

When the excavation is finished, the wheel loader 101 is retreated from the excavating operation position at a high speed in for example a reverse second speed gear, see arrow 304 and the wheel loader is turned to the right (or to the left), see arrow 305. The wheel loader 101 then moves forward, see arrow 306, while turning hard to the left (or right), then straightens out the vehicle to travel to approach the dump truck 601 at a high speed, see arrow 307. The lifting arm unit 106 is raised, the bucket 107 tilted and the material is deposited on the container of the articulated hauler. When a loading operation of the dump truck 601 is finished, the wheel loader 101 moves away in reverse from the dump truck 601 at a high speed, see arrow 308, turns to a stop position and is driven forwards again 310 towards the natural ground 301.

Figure 4:
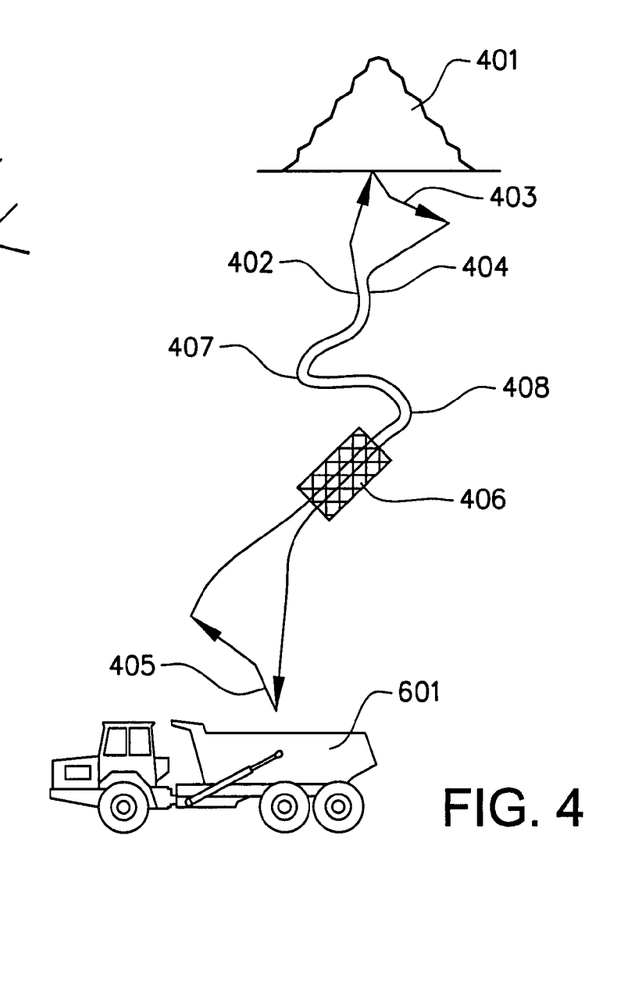
FIGS. 4 and 5 illustrates a load carrying mode of the wheel loader.

With reference to FIG. 4, a work cycle in the form of so-called load carrying for the wheel loader 101 is shown. The load carrying is characterized in that the longest distance that the vehicle travels between the loading and the unloading position is within a predetermined range, in this case 15-75 meters.

The arrows indicated by reference numerals 402-405 in FIG. 4 relate to four vehicle movements, namely forwards towards and interaction with the material (gravel or stone) 401 that is intended to be moved, backwards with the material in the bucket 403, forwards again 404 to the unloading position (articulated hauler 601) where the material is intended to be placed, and thereafter backwards 405 to the initial position.

The wheel loader experiences two turns 407, 408 on its route between the loading position and the unloading position. Further, it passes an area 406 of loose ground resulting in an increased rolling resistance.

Figure 5:
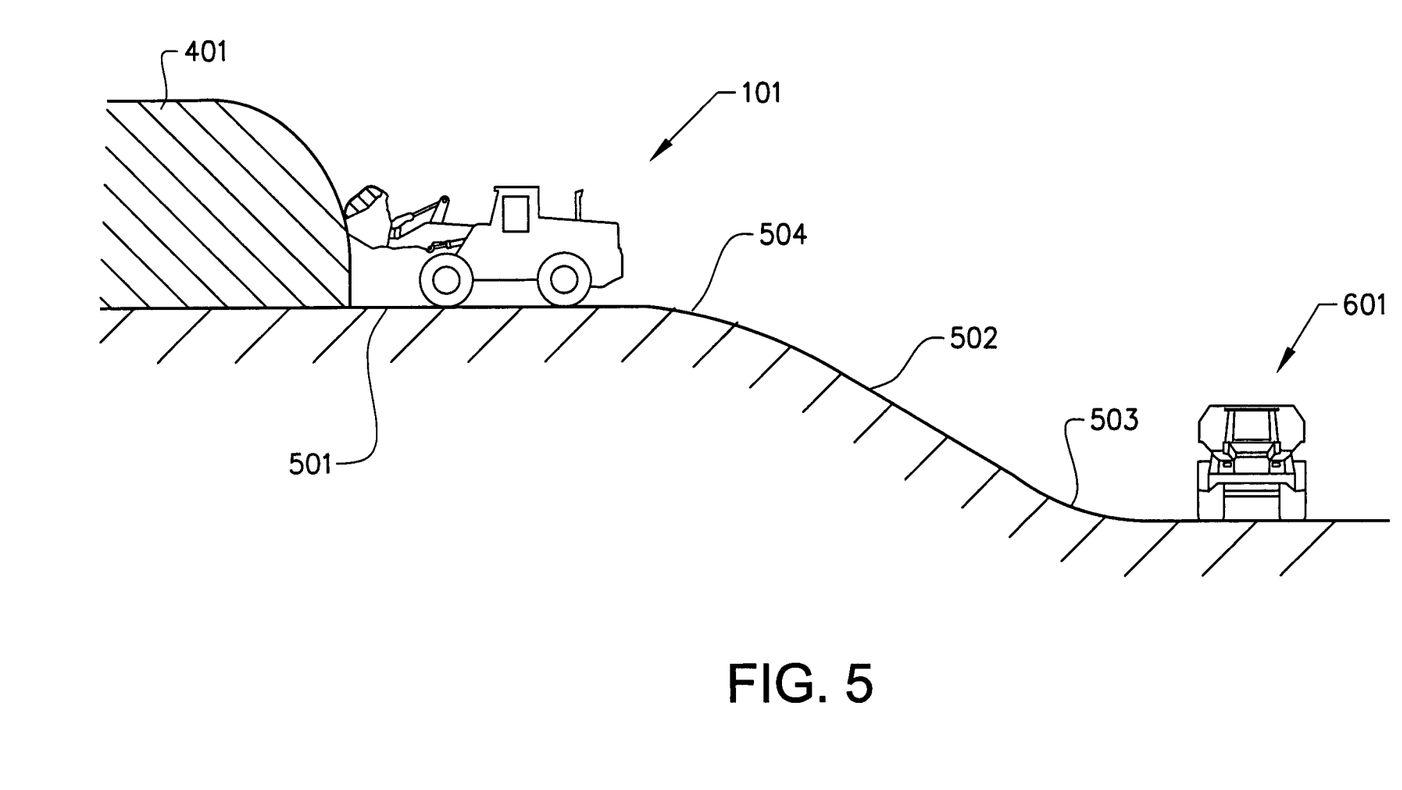

FIG. 5 shows a further example of a work cycle in a side view. The material is collected (scooped up) at a plateau 501 and delivered to the articulated hauler 601 at a lower position. The work cycle path comprises a steep portion 502 between the loading position and the unloading position. The starting point of the steep slope is indicated by reference numeral 503 and the finishing point of the steep slope is indicated by reference numeral 504.

Each curve 407,408, the starting point and finishing point of the loose ground 406, and the starting point and finishing point of the slope 502 define an event in a sequence of events that the wheel loader experiences while performing the load carrying work cycle.

During a first route of the load carrying work cycle, a plurality of operational parameters are detected and recorded. Preferably, the detected operational parameter is indicative of a work machine behaviour.

More specifically, a powertrain load is continuously determined. The powertrain load may for example be determined by determining a converter torque.

Further, the turns 407,408 are detected by means of the steering angle sensor 226. The change 503, 504 of ground inclination is detected by means of the inclination sensor 228. Each of the detected operational parameters forms an input signal and is sent to the control unit 222 and recorded in the memory of the control unit 222.

Further, the geographical position of the wheel loader is detected and associated to each of the detected events by means of a navigation system. Preferably, satellite based system, such as GPS (Global Positioning System) is used for detecting these positions, see further below referring to FIG. 8. Thus, the work cycle route is represented by a path on a geographical map.

A control strategy is established on the basis of the operational parameter information in the input signals. More specifically, each detected operational parameter information is analyzed and if it is deemed to be of such a magnitude that it should effect the wheel loader control, it is represented by a control event in the sequence of control events. In other words, a model, or map, is built of the work cycle comprising information of a plurality of events, each linked to geographical position.

For example, a steep uphill can be located and the control strategy established so that any up gear shifts are avoided just before the uphill starts. In this way the number of gearshifts can be reduced. Preventing gear hunting is also possible (according to some known gear shift strategies, gear hunting is a known undesired phenomenon, wherein the terrain leads to a series of alternating upshifts and downshifts). Further, in down hill driving, the gearbox can skip gear shifts more easily and thereby increasing acceleration and keeping engine revs low.

Further, it is known that the steering of the vehicle is often stealing power when used. This often results in unnecessary down shifting in corners. By learning where the corner is the vehicle can hold the gearshift during the corner and thereby saving one down shift and one upshift.

According to a further example, the method comprises control of engagement/disengagement of a differential gear locking means in the powertrain, The clutches can be of dogbone type of differential lock, differential sliding plate clutches, only sliding plate clutches or any other means of connection between front/rear or left/right side of driveline. Those clutches are used to increase the off road driveability, but often the clutches are engaged when not needed and this costs fuel since there is inevitably a speed difference between different wheels and this introduces trapped torque in the driveline. Wear on gears are also increased. Based on the information of the slipping ground, it is determined if the differential gear locking means should be engaged and for how long during the defined portion of the work cycle route.

By using a GPS the transmission can for example learn where a steep uphill is located and thereby engaging clutches just before the uphill starts or where there is a slipping surface. In this way the total time of clutch engagement can be reduced. Preventing clutch engagement of clutches also increases top speed and acceleration.

Another example is learning where the heap of material is located in the Loader case. This is especially useful for automatic activating of transverse differential clutches or limited slip differentials, mostly in the front axle. Longitudinal and rear axles may also be activated of course. Further, a kickdown may be initiated automatically.

Figure 6:
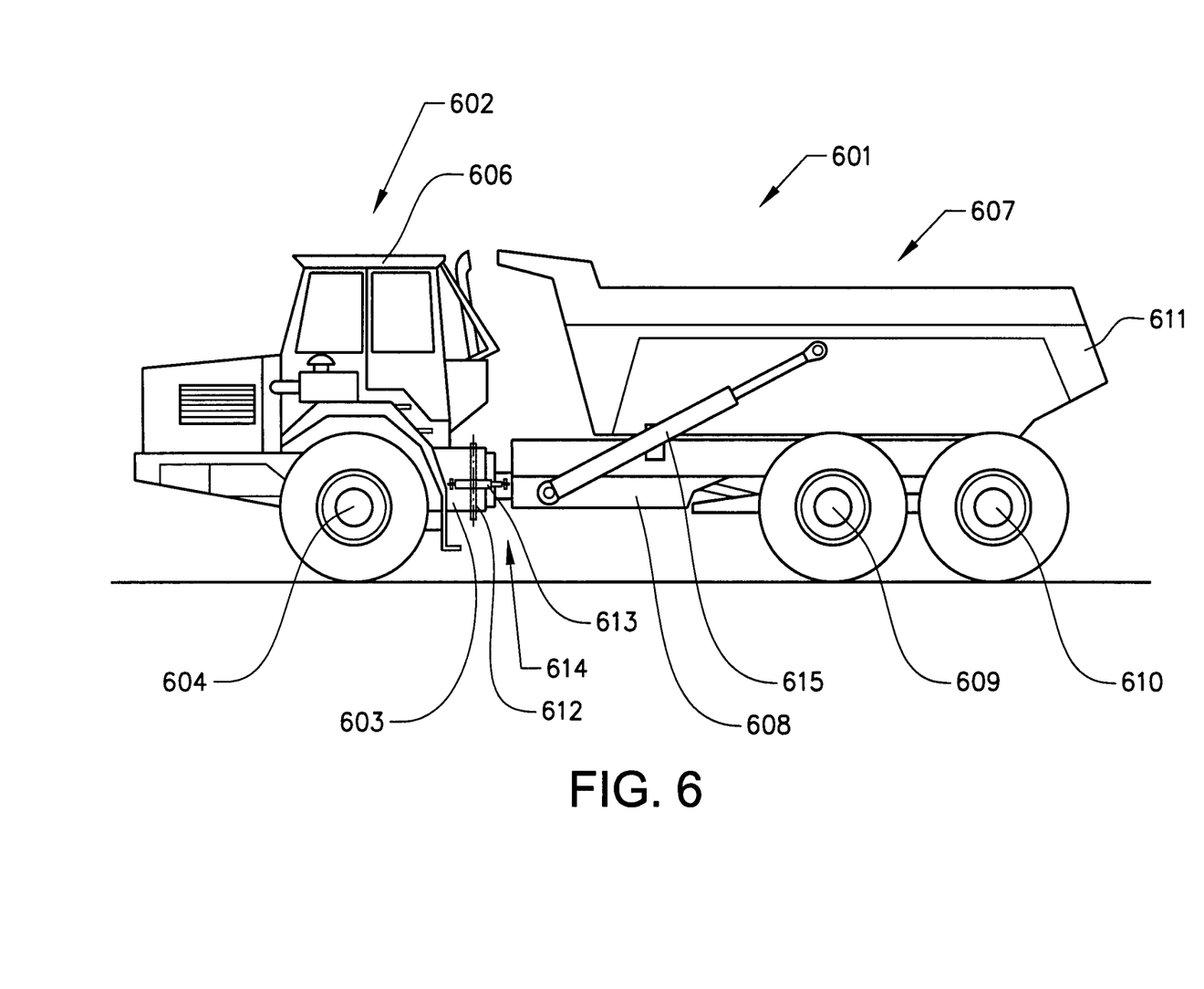
FIG. 6 illustrates an articulated hauler in a side view.

FIG. 6 illustrates the articulated hauler 601 in a side view. The articulated hauler 601 comprises a front vehicle section 602 comprising a front frame 603, a front wheel axle 604 and a cab 606 for an operator. The articulated hauler 601 also comprises a rear vehicle section 607 comprising a rear frame 608, a front wheel axle 609, a rear wheel axle 610 and a tiltable load-carrying container, or platform 611. The container 611 is tiltable relative to the rear frame 608 via two actuators 615 in the form of hydraulic cylinders. The front and rear wheel axle 609,610 of the rear vehicle section 607 are connected to the rear frame via a bogie arrangement (not shown) and may therefore be referred to as front bogie axle 609 and rear bogie axle 610.

The articulated hauler 601 is designed for switching between operations using various driving wheel combinations, all six wheels on the three axles being selectively operable as driving wheels, depending on the prevailing operating conditions. The articulated hauler may have a weight in the order of 15-30 metric tons and may be loaded with a payload in the order of 20-35 tons.

The front frame 603 is connected to the rear frame 608 by means of a first articulation joint 612 allowing the front frame 603 and the rear frame 608 to pivot relative to one another about a vertical axis for steering the vehicle. Thus, the articulated hauler 601 is a so-called frame-steered vehicle. A pair of hydraulic cylinders 613 is arranged one on each side of the articulation joint 612 and controlled by an operator via a steering wheel and/or a joy stick (not shown) for steering the vehicle.

A second articulation joint 614 is configured for allowing the front frame 603 and the rear frame 608 to pivot relative to one another about an imaginary longitudinal axis, i.e. an axis extending in the longitudinal direction of the vehicle 601. The articulation joint comprises two correspondingly shaped tubular parts, a first part secured to the front frame 603 and a second part secured to the rear frame 608. The first part is glidingly received in the second part so that the front frame 603 may pivot relative to the rear frame 608 about said longitudinal imaginary axis.

Figure 7:
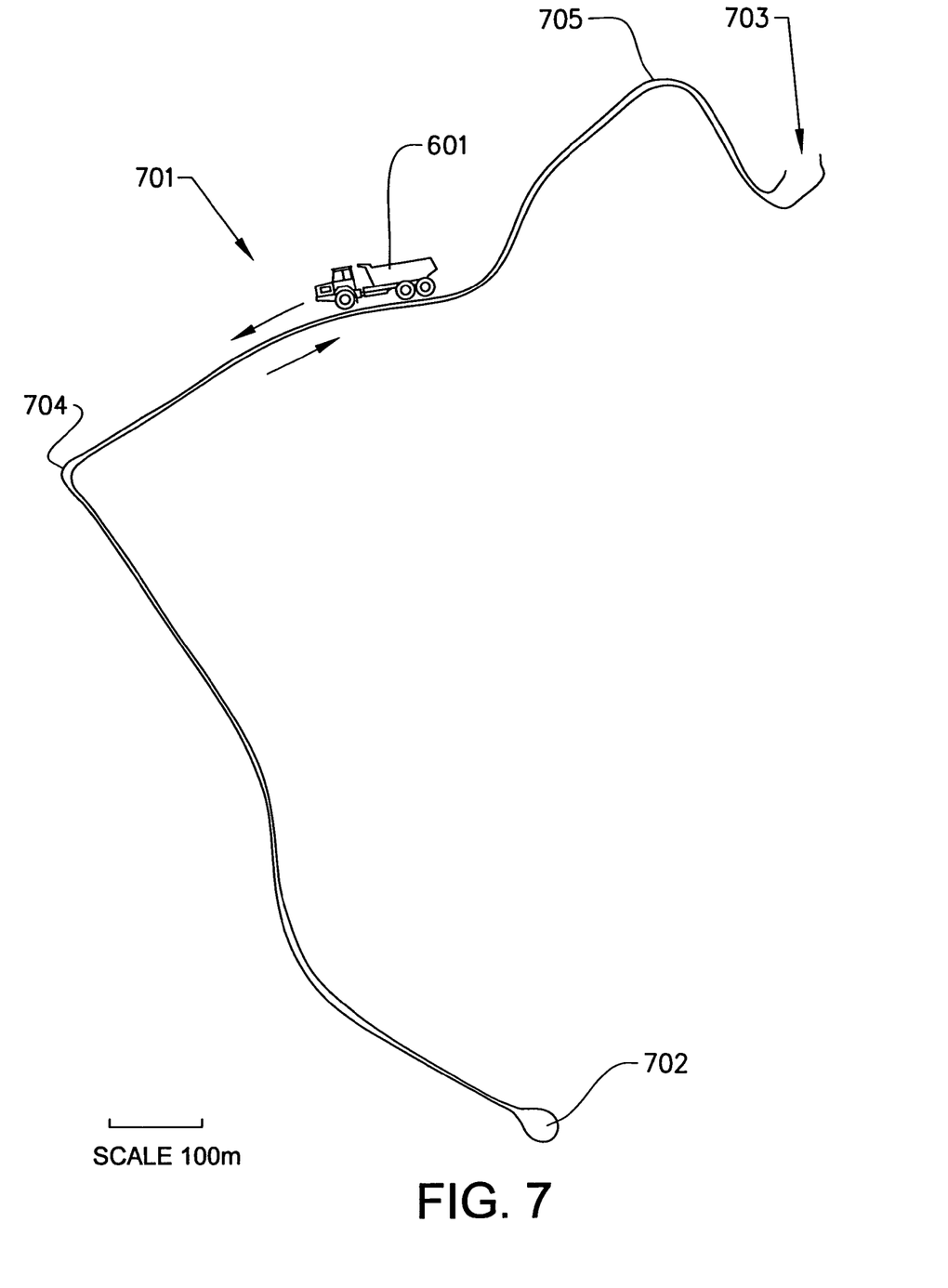
FIG. 7 illustrates a work cycle route in a view from above for the articulated hauler.

FIG. 7 illustrates a typical example of a work cycle route 701 between a loading position 702 and an unloading position 703 for the articulated hauler. An articulated hauler 601 is schematically indicated in FIG. 7 and the arrows indicate travel direction along the travel path. The route 902 comprises two sharp turns 704,705. A control strategy is established for the work cycle 701 in a similar manner as has already been described above for the wheel loader.

Figure 8:
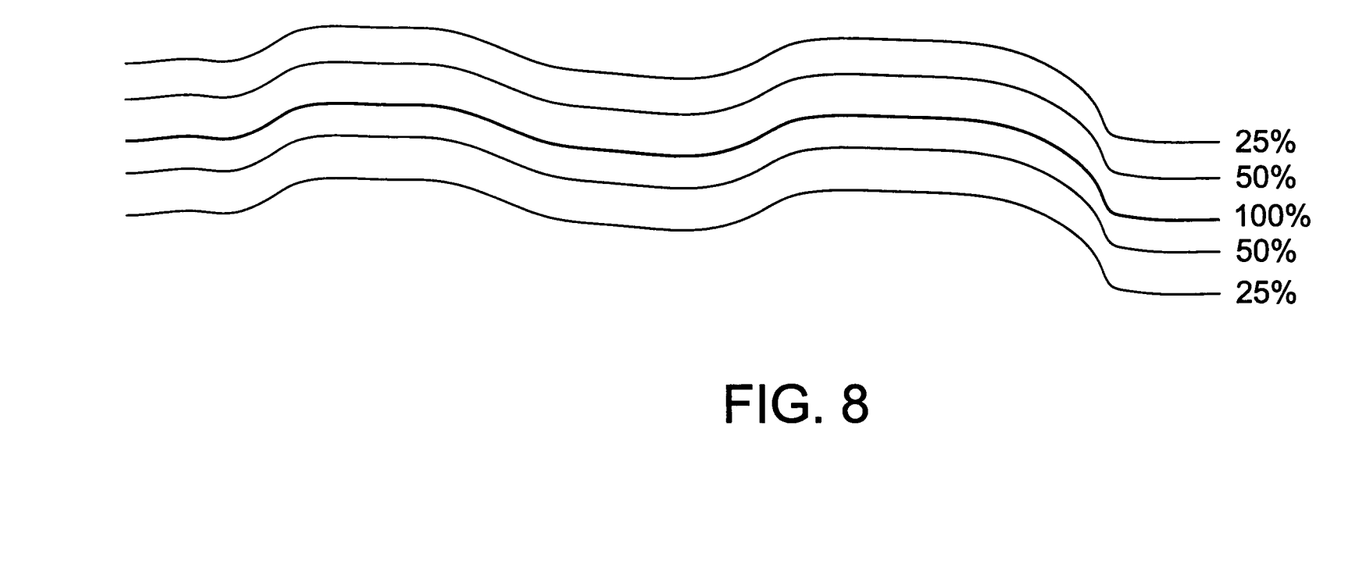
FIG. 8 illustrates altering of the control in response to a deviation of the traveled route from the established work cycle route.

FIG. 8 illustrates a weighing of control information in response to an actual position of the work machine relative to a specific work cycle travel path. One aspect in realization of this invention is how accurate the actual position must be compared to the established work cycle travel path. If for example the driver is choosing a different track, lets say five meters to the left of the normal track, what decision should then be taken? If there is an uphill in the normal case it is probable that there will be an uphill in the new track too. But if there is a road in the normal case, it could be a ditch in the new track. The most realistic approach is to weigh the information due to how close the actual position is the established work cycle travel path.

Figure 9:
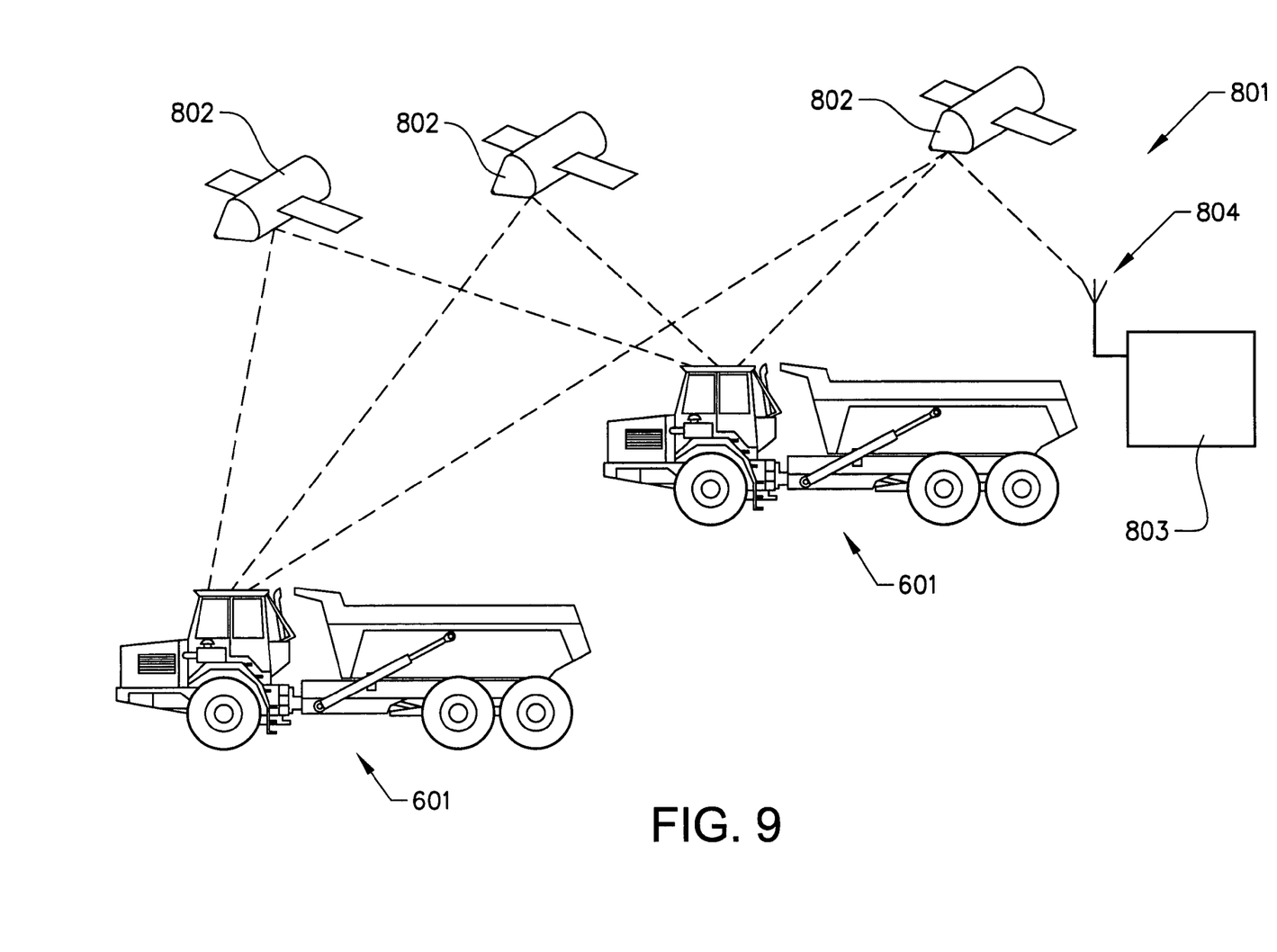
FIG. 9 illustrates a system for controlling a fleet of work machines in a work site.

FIG. 9 schematically discloses a system 801 for monitoring and/or controlling a plurality of work machines 601 in a work site. The system 801 comprises a plurality of satellites 802 and a remote base station 803 with receiving and transmitting means 804. Each work machine 601 has means 232 (see FIG. 2) for detecting its position via the satellites. Further, each machine has transmitting means adapted to send signals with position information and information regarding the detected operational parameters to the base station 803. Preferably, after having performed a work cycle, the work machine sends a signal to the base station comprising information of detected operational parameters and/or work machine operational characteristics.

In this way, information regarding the control strategy may be shared between different work machines for operation in the repeated work cycle in question in the same geographical region or work site. In other words, if several work machines will perform the same work cycle, it is sufficient that the first work machine, in chronological order, that performs the work cycle collects relevant data and establishes the control strategy, and preferably stores the established control strategy in a memory. This information can then be distributed to the other work machines. A certain time limit should be present in order to not use too old information. Examples of conditions changing over time are weather conditions such as ice and rain which both affects the driving.

Of course, as an alternative, information regarding detected operational parameters and associated positions may be sent to the base station, wherein the control strategy is established by the base station. Further, several laps of the work cycle may be used for establishing the sequence of events. Further, information from several work machines may be used for establishing the control strategy. The plurality of work cycle laps for establishing the control strategy may be performed by a single work machine, or by different work machines. Thus, an established control strategy may be altered continuously in response to new information. This may be important in cases where the ground conditions changes over time, if the weather changes (fall of rain, snow) etc. Further, an established control strategy may be altered according to individual characteristics of a specific work machine.

Figure 10:
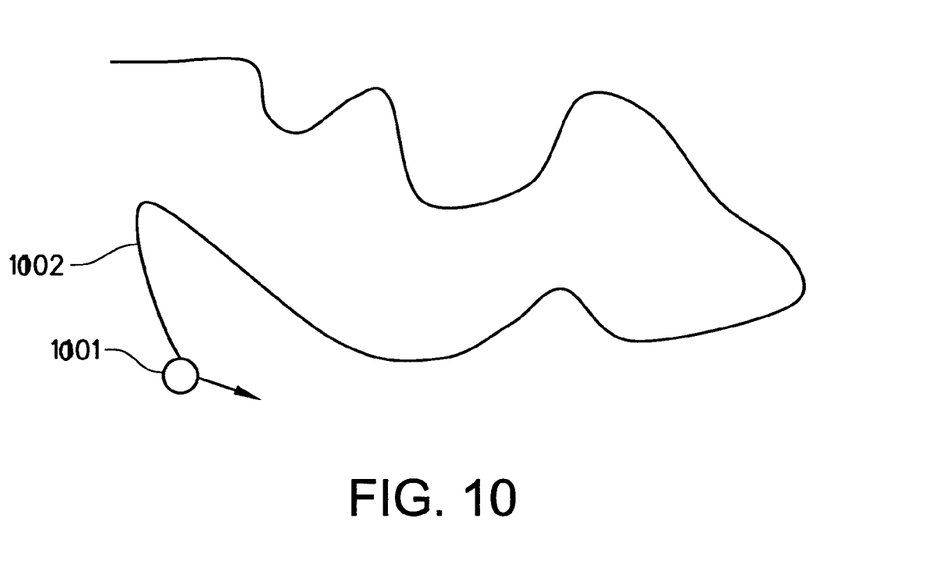
FIG. 10 illustrates a work cycle travel path defined by a work machine in operation.

FIG. 10 illustrates, in a view from above, a work machine 1001 in operation. The position of the work machine 1001 is continuously recorded, wherein a work cycle travel path 1002 is established behind the work machine 1001. The arrow indicates the direction of the work machine.

Figure 11:
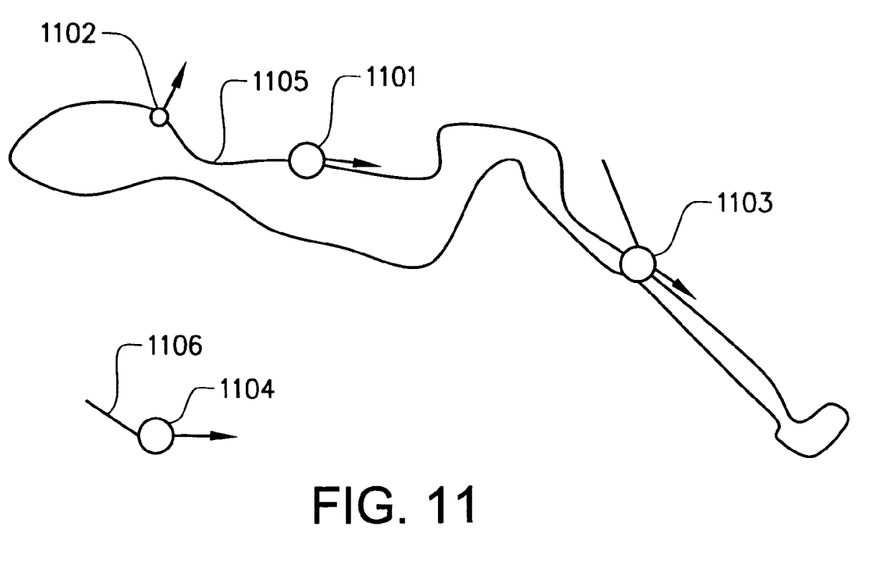
FIG. 11 illustrates the positions of a plurality of work machines relative to a work cycle travel path.

FIG. 11 illustrates, in a view from above, a plurality of work machines 1101, 1102, 1103, 1104 in operation. A first work, machine 1101 operates in a repeated work cycle. More specifically, the work machine 1101 drives along a work cycle travel path 1105, which it created during an earlier lap of the work cycle. A second work machine 1102 is about to leave the work cycle travel path 1105. A third work machine 1103 enters the work cycle travel path 1105. A fourth work machine 1104 creates a separate work cycle travel path 1106.

According to an exemplary method, the GPS is used to determine a present position, speed, direction, acceleration and a derivative of the direction of an individual work machine, see for example the third work machine 1103 in FIG. 11, in operation. Further, it is determined whether it follows an existing work cycle path 1105. The existing work cycle travel path can either be a travel path earlier established by the work machine in question or by another work machine. Thus, preferably, the different work machines are in communication with each other. More specifically, the position of the third work machine 1103 and its future position are predicted by means of a confidence interval, for example by means of a Kalman filter. In this case, the third work machine 1103 has just entered the work cycle travel path 1105 of the first work machine 1101. When it is determined that the third work machine 1104 has entered and is following the travel path 1105, the third work machine 1103 is controlled according to the control strategy associated to the existing work cycle travel path 1005.

According to the short cycle loading via the wheel loader, see FIG. 3, the work machine operational characteristics associated to performing the work cycle may comprise events/steps such as a detected unloading height (ie a vertical position of the bucket), the position of the gravel 301, the position of the articulated hauler, the ground conditions, any height difference between the loading position and unloading position etc.

According to an alternative to building the control strategy from detected operational parameters only from at least one performed work cycle, at least part the control strategy could be pre-established by means of topographical maps and a planned work cycle route.

According to an alternative, the unloading position could be in a pile, in a stone crusher etc instead of onto another vehicle.

According to an alternative, the control strategy comprises information with regard to operating the work implement and the method comprising the step of controlling operation of the work implement. More specifically, the work implement information regards a work machine hydraulic system information and the method comprises the step of controlling the hydraulic system (especially the pump(s)). This alternative is particularly useful for work machines, where a substantial power is required for operating the work implement. This is the case in a wheel loader, see FIG. 1-3. More specifically, the control strategy may comprise information regarding power distribution between the hydraulic system and the powertrain and the method comprises the step of controlling power distribution in the power transmission system in response thereto.

Further, the control strategy may comprise information regarding power required to lift and dump a load etc.

According to an alternative, the control strategy comprises information regarding power source control and the method comprises the step of controlling a power source (such as an internal combustion engine 202, see FIG. 2) in response thereto.

The work machine may be equipped with a diesel particle filter. In such a case, the control strategy may comprise information regarding when to regenerate the particle filter. The particle filter is preferably regenerated when the work cycle travel path ahead indicates a high torque requirement. On the other hand, if the system loses the GPS signal, it is assumed that the work machine is in a tunnel or within a building. In such a case, regeneration is unsuitable and therefore prevented.

According to a further alternative, the control strategy comprises information regarding controlling loads such as an engine cooling fan, an air conditioning system or the batteries. The control strategy is preferably-designed so that such activation is prevented before the work machine reaches an uphill and/or when the hydraulic system is used (for lifting a load during short cycle loading). On the other hand, the loads may be applied when the work cycle ahead indicates a downhill. Further, in the case of an articulated hauler, the loads may be activated when the hauler is located in the loading position.

According to a further alternative, the control strategy comprises information regarding controlling charge of a battery and/or cooling the engine. Preferably, the battery is charged and/or the engine is cooled in a downhill.

According to a further alternative, the control strategy comprises information regarding controlling the hydraulic system. The hydraulic system is preferably deactivated during transport. Further, the hydraulic system may be deactivated during cornering while simultaneously driving up a ramp.

According to a further alternative, the control strategy comprises information regarding controlling the pressure in the tires. The tire pressure is preferably controlled depending on a ground condition.

According to a further alternative, the control strategy comprises information regarding controlling the vehicle brakes and the method comprises the step of controlling at least one vehicle brake in response thereto. The controlled vehicle brake may be constituted by the service brake, the parking brake, the emergency brake, retarder brake function or engine brake etc.

According to a further alternative, the memory in the control unit 222 may comprise a plurality of control strategies, each associated to a specific work cycle.

The control unit 222 may be adapted to automatically recognize which work cycle the work machine is performing by detecting location and direction of the work cycle, and thereafter control the work machine according to the correct control strategy.

According to an alternative, a wheel speed sensor is arranged at a wheel for determining a slip condition and generates a corresponding signal for input to the controller 222. Thus, the wheel speed sensor is adapted to detect a ground condition. Preferably, one wheel sensor is arranged at each wheel.

According to an alternative, a transverse inclination sensor determines the transverse acceleration of the work machine and generates a corresponding signal for input to the controller. In other words, the sensor generates information regarding if the work machine is running through a curve or over a bumpy ground. Thus, the transverse inclination sensor is adapted to detect a lateral acceleration of the work machine.

The detected operational parameters during performance of the work cycle are not limited to work machine operating parameters, but may also comprise information of the surrounding area, especially the area ahead of the work machine along the work cycle travel path, such as slopes etc. Such external operational parameters may be detected via a camera or other means for reproduction of the area.

According to a further example, part of the work cycle may be performed in an environment that demands for a substantially different control strategy. For example, the work cycle route may extend in an environment that is of a substantially different temperature, such as higher temperature (for example in a smelting plant), than the rest of the work cycle route. Due to the fact that this is known before an individual work machine performs the work cycle, a cooling capacity may be raised before the work cycle reaches the smelting plant.

The speed of the engine 202 is detected by an engine speed sensor (not shown). The engine speed sensor is arranged to generate a signal with the engine speed information for the control unit 222. In this way, an engine load can be determined. The engine operation information may be utilized for controlling the gear mode.

The invention claimed is:

1. A method for controlling a work machine during operation in a repeated work cycle when the work machine travels along a work cycle travel path between a loading position and an unloading position, comprising controlling the work machine in response to a predetermined control strategy that is based on at least one condition that varies in the course of the work cycle travel path, wherein the control strategy comprises information regarding selection of a gear mode from a plurality of gear modes based on the work cycle travel path condition, controlling a transmission in accordance with the selected gear mode, and using a satellite based system for establishing a travel path of the work cycle and establishing the control strategy accordingly.

2. A method according to claim 1, wherein the method comprises the step of controlling at least one device in a work machine power transmission system in response to the predetermined control strategy during operation of the work machine in the work cycle.

3. A method according to claim 1, wherein the control strategy comprises work machine powertrain operating information and the method comprising the step of controlling a powertrain component.

4. A method according to claim 1. wherein the control strategy comprises information regarding a differential gear operation and the method comprising the step of controlling the differential gear.

5. A method according to claim 1, wherein the control strategy comprises information regarding engagement of a differential gear lock and the method comprising the step of controlling the differential gear lock.

6. A method according to claim 1, comprising, the step of establishing the control strategy on the basis of the at least one condition that varies in the course of the work cycle.

7. A method according to claim 1, wherein the condition variation comprises a change in the work cycle travel path.

8. A method according to claim 1, wherein the condition variation comprises a change of direction of the work cycle travel path in a horizontal plane.

9. A method according to claim 1, wherein the condition variation comprises a change of ground inclination of the work cycle travel path.

10. A method according to claim 1, comprising the step of detecting least one operational parameter during operation of a work machine in the work cycle in question, and establishing at least part of the control strategy on the basis of a magnitude of the detected operational parameter.

11. A method according to claim 10, comprising the step of repeatedly detecting the at least one operational parameter.

12. A method according to claim 10, comprising the step of detecting an operational parameter indicative of the work machine weight.

13. A method according to claim 10, comprising the step of detecting at least one operational parameter indicative of an end position of the work cycle.

14. A method according to claim 13, wherein the end position is indicative of a source of material to be transported and/or a final destination of the material.

15. A method according to claim 10, comprising the step of detecting an operational parameter indicative of a work machine inclination.

16. A method according to claim 10, comprising the step of detecting an operational parameter indicative of the speed of the work machine.

17. A method according to claim 1, comprising the step of predicting at least part of the condition variation on the basis of preavailable information of the work cycle in question.

18. A method according to claim 17, wherein the preavailable information of the work cycle comprises a geographical map.

19. A method according to claim 1, wherein the control strategy comprises a plurality of control steps, wherein each step is established on the basis of a specific condition variation.

20. A method according to claim 1, wherein the travel path of the work cycle comprises a plurality of positions, wherein each position is established on the basis of a specific condition variation.

21. A method according to claim 20, wherein the work cycle travel path comprises a plurality of positions between a loading position and an unloading position.

22. A method according to claim 1, comprising the step of determining a present position, speed and direction of a work machine in operation, determining whether it follows an existing work cycle path and thereafter controlling the work machine according to the control strategy provided the work machine follows the existing work cycle travel path.

23. A method according: to claim 22, comprising the step of determining an acceleration of the work machine.

24. A method according to claim 22, comprising the step of determining a derivative of the direction of the work machine.

25. A method according to claim 1, comprising the step of establishing the control strategy based on a plurality of performed work cycles.

26. A. method according to claim 1, comprising the step of sharing information regarding the control strategy between different work machines for operation in the work cycle in question.

27. A method according to claim 1, comprising the step of sending information with regard to the control strategy from a work machine to a remote position.

28. A method according to claim 1, comprising the step of receiving information with regard to the control strategy from at least one work machine at a remote position, establishing, the control strategy at the remote position, and distributing the established control strategy to at least one work machine.

29. A method according to claim 1, comprising the step of monitoring a position of a work machine while performing the work cycle, and adjusting the control strategy for controlling the specific work machine in response to a deviation of the work machine's position from the established work cycle travel path.

30. A non-transitory computer readable medium comprising a computer program comprising computer program segments for implementing, the method as claimed in claim 1.

31. A computer comprising a computer program for implementing the method as claimed in claim 1.

32. A method for controlling a work machine during operation in a repeated work cycle when the work machine travels along a work cycle travel path between a loading position and an unloading position, comprising controlling the work machine in response to a predetermined control strategy that is based on at least one condition that varies in the course of the work cycle travel path, wherein the control strategy comprises information regarding selection of a gear mode from a plurality of gear modes based on the work cycle travel path condition, controlling a transmission in accordance with the selected gear mode, and detecting at least one operational parameter during operation of a work machine in the work cycle in question, establishing at least part of the control strategy on the basis of a magnitude of the detected operational parameter, and detecting an operational parameter indicative of a rolling resistance.

33. A method for controlling a work machine during operation in a repeated work cycle when the work machine travels along a work cycle travel path between a loading position and an unloading position, comprising controlling the work machine in response to a predetermined control strategy that is based on at least one condition that varies in the course of the work cycle travel path, wherein the control strategy comprises information regarding selection of a gear mode from a plurality of gear modes based on the work cycle travel path condition, controlling a transmission in accordance with the selected gear mode, and detecting at least one operational parameter during operation of a work machine in the work cycle in question, establishing at least part of the control strategy on the basis of a magnitude of the detected operational parameter, and detecting an operational parameter indicative of a resistance due to ground inclination.

* * * * *